United States Patent
Petrou et al.

(10) Patent No.: US 12,348,172 B2
(45) Date of Patent: Jul. 1, 2025

(54) CONTROL UNIT FOR CONTROLLING A MOTOR

(71) Applicant: MARQUARDT GMBH, Rietheim-Weilheim (DE)

(72) Inventors: Efstratios Petrou, Constance (DE); Guanwei Wu, Pudong Shanghai (CN)

(73) Assignee: MARQUARDT GMBH, Rietheim-Weilheim (DE)

( * ) Notice: Subject to any disclaimer, the term of this patent is extended or adjusted under 35 U.S.C. 154(b) by 128 days.

(21) Appl. No.: 18/019,589

(22) PCT Filed: Mar. 9, 2021

(86) PCT No.: PCT/EP2021/055871
§ 371 (c)(1),
(2) Date: Feb. 3, 2023

(87) PCT Pub. No.: WO2022/033725
PCT Pub. Date: Feb. 17, 2022

(65) Prior Publication Data
US 2023/0216436 A1    Jul. 6, 2023

(30) Foreign Application Priority Data
Aug. 13, 2020 (DE) ...................... 10 2020 121 317.4

(51) Int. Cl.
*H02P 3/12* (2006.01)
*H02K 11/215* (2016.01)
*H02P 6/24* (2006.01)

(52) U.S. Cl.
CPC .............. *H02P 3/12* (2013.01); *H02K 11/215* (2016.01); *H02P 6/24* (2013.01)

(58) Field of Classification Search
CPC ..... H02P 3/12; H02P 6/24; H02P 3/08; H02K 11/215
See application file for complete search history.

(56) References Cited

U.S. PATENT DOCUMENTS

2002/0127115 A1   9/2002  Lucke et al.
2010/0194315 A1   8/2010  Kusakawa et al.
(Continued)

FOREIGN PATENT DOCUMENTS

DE    102018122837 A1    3/2019
EP         0578366 A2    1/1994
(Continued)

OTHER PUBLICATIONS

International Search Report (English) and Written Opinion (German) of the International Search Authority, issued in PCT/EP2021/055871, mailed May 31, 2021; ISA/EP.

*Primary Examiner* — Said Bouziane
(74) *Attorney, Agent, or Firm* — Harness, Dickey & Pierce, P.L.C.

(57) ABSTRACT

The invention relates to a control unit (1) for a motorized device (10) comprising: a brushless motor (20), a power supply (30), an operating unit (40), which can be activated by a user, wherein the control unit (1) is designed at least for controlling the commutation of the motor (20) by a plurality of circuit breakers (12, 13, 14, 15, 16, 17) connected to the power supply, and for initiating an electronic (i.e. in particular non-mechanical) braking of the motor, wherein the control unit (1) is deactivated, i.e. switched off, for a rotational speed-dependent duration to by means of a position sensor (50) and is held until then in an active switched-on operating state and, dependent thereon, a control means (60) is provided then to initiate, under automatic control, the shutdown of the device (10).

11 Claims, 3 Drawing Sheets

(56) References Cited

U.S. PATENT DOCUMENTS

2014/0300987 A1* 10/2014 Otaguro .................. H02P 3/18
                                                             318/362
2015/0091480 A1    4/2015 Kischka et al.
2018/0367070 A1* 12/2018 Ichikawa ................ B24B 47/12
2019/0084107 A1    3/2019 Yabuguchi

FOREIGN PATENT DOCUMENTS

| EP | 1318596 A2 | 6/2003 |
| EP | 1760874 A2 | 3/2007 |
| EP | 2520397 A1 | 11/2012 |
| EP | 2854283 A2 | 4/2015 |

* cited by examiner

CONTROL UNIT FOR CONTROLLING A MOTOR

CROSS-REFERENCE TO RELATED APPLICATIONS

This application is a 371 U.S. National Phase of International Application No. PCT/EP2021/055871, filed Mar. 9, 2021, which claims priority to German Application No. 10 2020 121 317.4 filed Aug. 13, 2020. The entire disclosures of the above applications are incorporated herein by reference.

BACKGROUND

This disclosure relates to a control unit to control a motor, in particular to the commutation of a motor, and to a method for controlling a motor, as well as to a device with the control unit.

Conventionally, motor-driven devices are driven, for example, by brushed permanent magnet (PM) motors that receive direct current from a power source or alternating current that has been appropriately converted by an inverter. Such a motor has a direct impact on many of the operating characteristics of the motor-driven device, such as the output torque, service life, running characteristics, etc.

Output torque refers to the ability of electric-motor-driven equipment to work under heavier loads without stalling. The service life of an electric motor-driven device that is powered by a rechargeable battery is strongly influenced by the energy efficiency of the motor. A high energy efficiency of the motor is therefore desirable. Many factors affect the lifetime of such a device, including the type and design of the motor used to convert electric to mechanical power.

Brushed motors, such as the PM brushed motors, that are commonly used in appliance applications are prone to brush damage over time. The most important mechanical property that distinguishes brushless permanent magnet motors from brushed permanent magnet motors is the manner in which the motor is commutated. In a brushed PM motor, the commutation is achieved mechanically by a commutator and a brush system. In contrast, in a brushless DC motor, commutation is accomplished electronically by controlling the flow of current to the stator windings.

A brushless DC motor includes a rotor, providing rotational energy, and a stator, providing a magnetic field that drives the rotor. The rotor has a shaft that is supported by a bearing set on each side. It is surrounded by a permanent magnet (PM) that creates a magnetic field. The stator core is mounted around the rotor with an air gap that is maintained at all points with the exception of the interface of the bearing set.

Depending on the configuration, each of the windings is typically oriented so as to be parallel to the rotor shaft. Furthermore, so-called power components such as MOSFETs, that are connected to each winding in order to enable a selective power feed for each winding, are provided for commutation. When current is applied to a winding, the resulting current in the winding creates a magnetic field that couples to the rotor. The magnetic field associated with the permanent magnet in the rotor assembly attempts to align with the magnetic field generated by the stator, causing the rotor to rotate. One key element here is the controller enables the commutation to be performed according to a specific commutation pattern.

A control circuit sequentially activates each stator coil so that the PM attached to the rotor continuously drives the progressive magnetic field that is generated by the stator windings. A set of sensing magnets coupled to the PMs in the rotor assembly are sensed by a sensor, such as a Hall effect sensor, for example, in order to identify the current position of the rotor assembly.

Correct timing of the commutation sequence is maintained by monitoring sensors that are mounted on the rotor shaft or by detecting magnetic field peaks or nulls associated with the PMs.

Such a brushless motor offers many advantages over conventional brushed motors. Due to brush wear, conventional brushed motors are substantially less durable than brushless motors. Because commutation is handled by a microcontroller, mechanical failures associated with commutation are minimized, and failure conditions are improved. What is more, due to the friction and heat associated with the brushes and commutator, brushed motors are less efficient than brushless motors.

However, using a controller to control motor-driven equipment that is traditionally mechanical presents a special challenge. For example, while equipment motors have traditionally been mechanically braked when the motorized equipment is turned off or the trigger is released by the user, braking brushless motors electronically via a controller can be problematic, particularly because turning the motorized equipment off automatically shuts off the controller.

In addition, it can sometimes be difficult to synchronize the rotation of the rotor with the sequential commutation that is controlled by the controller.

A motor-driven tool and a method for controlling a motor are known from US 2010/0194315 A, although an optimized braking concept is not disclosed there.

EP 0 578 366 A2 discloses a controlled braking device for electric motors and, in particular, portable power tools. A motor drive device and a motor drive method are known from EP 1 318 596 A2.

Printed publication US-A-2002/0127115 describes a pump with means for activating a dynamic brake when the pump decelerates below a predefined pump speed.

A further solution for a motor-driven tool is known from EP 2520397 A1.

SUMMARY

It is the object of the present disclosure to overcome or at least improve upon the drawbacks that are known from the prior art in this context. The present disclosure provides an optimized control unit that is able to reliably and inexpensively brake the motor in a brushless commutated motor.

Another aspect of the present disclosure relates to a motor-driven tool (power tool) that can be operated and, in particular, braked according to the disclosed concept.

According to the disclosure, a control unit for a motor-operated device comprises a brushless motor, a power supply, and an operating unit that can be activated by a user. The control unit is designed at least for controlling the commutation of the motor by a plurality of circuit breakers connected to the power supply. The control unit remains initially switched on and active for a rotational speed-dependent time after the detection of a specific position sensor or Hall sensor signal state. The Hall sensor signal state is indicative of the motor being completely stopped and the shutdown of the power tool is to be initiated.

As such, the controller is designed to initiate an electronic (i.e., in particular non-mechanical) braking of the motor. The control unit is deactivated, i.e., switched off, for a rotational speed-dependent duration $t_D$ after the detection of a specific position sensor state and maintained until in an active switched-on operating state and, dependent thereon, a control mechanism automatically initiating the shutdown of the device.

In an advantageous embodiment of the disclosure, the position sensor is a Hall sensor that transmits a signal to the control unit that is indicative of the state of the motor.

It is likewise advantageous if a memory is provided where target values for the rotational speed-dependent time period $t_D$ are stored for a large number of motor speeds over the entire motor speed range. After the time period $t_D$ has elapsed, the actual speed (preferably recorded by the Hall sensor) is detected and a check is performed as to whether this is greater than zero and therefore whether the motor is still turning. In that case, the target value stored in the memory for this speed is increased by a predetermined factor.

In a likewise advantageous embodiment of the disclosure, the plurality of circuit breakers have a plurality of high-side switches that are connected to a corresponding plurality of low-side switches. Thus, the control unit switches the plurality of low-side switches and the plurality of high-side switches ON and OFF, alternately, in order to brake the motor.

In another preferred embodiment of the disclosure, the operating unit has an ON/OFF switch that can be operated both manually and by the controller when a shutdown condition occurs.

In another preferred embodiment of the disclosure, a power contact is provided between the power supply and the control unit in order to make current available to the control unit for the rotational speed-dependent duration $t_D$ when the ON/OFF switch has been switched off.

It is also advantageous if the controller detects the then-current speed immediately when the ON/OFF switch is switched off and the delay in the shutdown is controlled on that basis for the duration $t_D$ and the device is only then switched off.

Advantageously, the duration $t_D$, until the power supply is actually disconnected, is extended by the time period that is detected for the speed that had been initially stored for the speed after the elapsing of the time period $t_D$. This process is repeated successively until the motor actually stops. At the same time, the time periods $t_D$ that then turned out to be incorrect are corrected, namely by the cumulative time periods recorded by the controller, including up to the actual stoppage of the motor, where appropriate.

In another preferred embodiment of the disclosure, the controller has an energy storage, preferably a capacitor, where a specific amount of electrical energy is stored that is sufficient to provide the energy supply for a specific time period.

In a likewise preferred embodiment of the disclosure, the power supply of the controller is controlled after the ON/OFF switch is turned off by a predetermined discharge time by the stored energy in the capacitor, where a specific amount of electrical energy is stored that is sufficient to provide the energy supply for a specific time period.

In another preferred embodiment, the control unit has a programmable microcontroller or microprocessor, the power supply is a battery, and the plurality of circuit breakers are field-effect transistors.

In another aspect of the present disclosure, a method for controlling a motor of a device, such as a power tool, includes the following steps:

a. initiating a shutdown command of the device;
b. detecting the speed of the motor at that point in time;
c. identifying a holding period stored in a memory, namely a time span $t_D$ stored for the determined speed;
d. controlling a braking process for the time periods $t_D$ by commutating the motor via a control device, using a plurality of current switches that are connected to a power supply;
e. maintaining the active switched-on operating state for this time period $t_D$; and
f. shutting the device down.

Step f) includes disconnecting the controller from a power supply. In a preferred embodiment of the method, the speed is recorded before step f) or continuously, and step f) only takes place when a specific speed is reached or the speed is zero and it is therefore certain that the motor has come to a stop. Otherwise, steps b) to e) are repeated, in particular repeated successively, until the stoppage of the motor has been detected. The actual shutdown of the device then takes place only at a time after step a).

Another aspect of the present disclosure relates to a power tool having a control system as described above.

Other advantageous refinements of the disclosure are characterized in the subclaims and/or depicted in greater detail below together with the description of the preferred embodiment of the disclosure with reference to the figures.

DRAWINGS

DETAILED DESCRIPTION

In the following, the disclosure will be described in greater detail on the basis of an exemplary embodiment with reference to FIGS. 1 and 2. The same reference symbols indicate the same functional and/or structural features.

Figure 1:
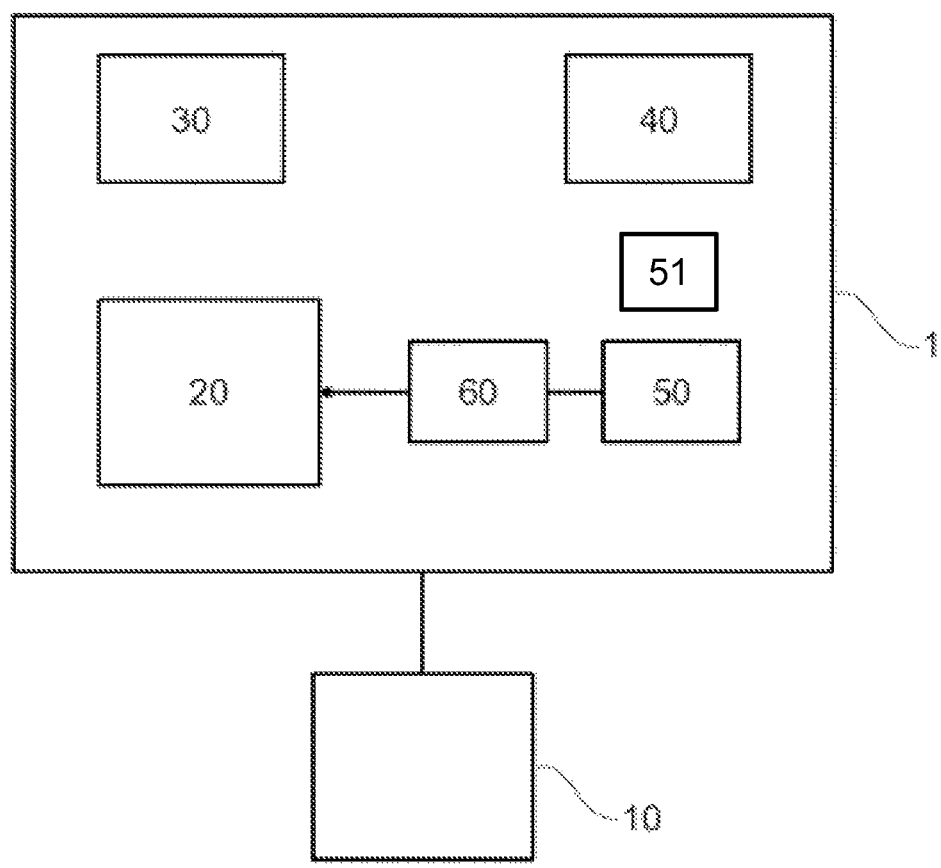
FIG. 1 Is a schematic view of an embodiment of a configuration of a motor controller, and FIG. 2 Is a schematic view of an exemplary circuit arrangement.

FIG. 1 shows a schematic representation of an embodiment of a configuration of a motor control by a control unit 1 for a motor-driven device 10. The control unit 1 includes a brushless motor 20, a power supply 30, and an operating unit 40. The device 10 and its power supply can be activated by a user via an ON/OFF switch 41 on the operating unit 40.

Since the control unit is deactivated in the solutions known from the prior art as soon as the device 10 is switched off by the operating unit 40, a motor that is rotating at this point in time can no longer be braked in an electronically controlled manner. The embodiment of the disclosure is illustrated, as an example, that the control unit 1 has a plurality of power switches or circuit breakers 12, 13, 14, 15, 16, 17 for commutating the motor 20. The circuit breakers 12, 13, 14, 15, 16, 17 are connected to the power supply during the braking process, as shown in the circuit arrangement in FIG. 2.

After the initiation of an electronic braking of the motor 20, the control unit 1 deactivates for a respective rotational speed-dependent time period $t_D$ only after the stoppage of the motor has been detected by the position sensor 50.

Until then, the control unit 1 remains in an active switched-on operating state in the conventional manner. The control mechanism 60 is provided in order to automatically initiate the shutdown of the device 10.

The position sensor 50 shown in FIG. 1 is a Hall sensor in this exemplary embodiment. A memory 51 is also provided. This stores the target values $t_{D,TARGET}$ for the rotational speed-dependent duration $t_D$ for different motor speeds in the permissible motor speed range of the motor 20.

Figure 2:
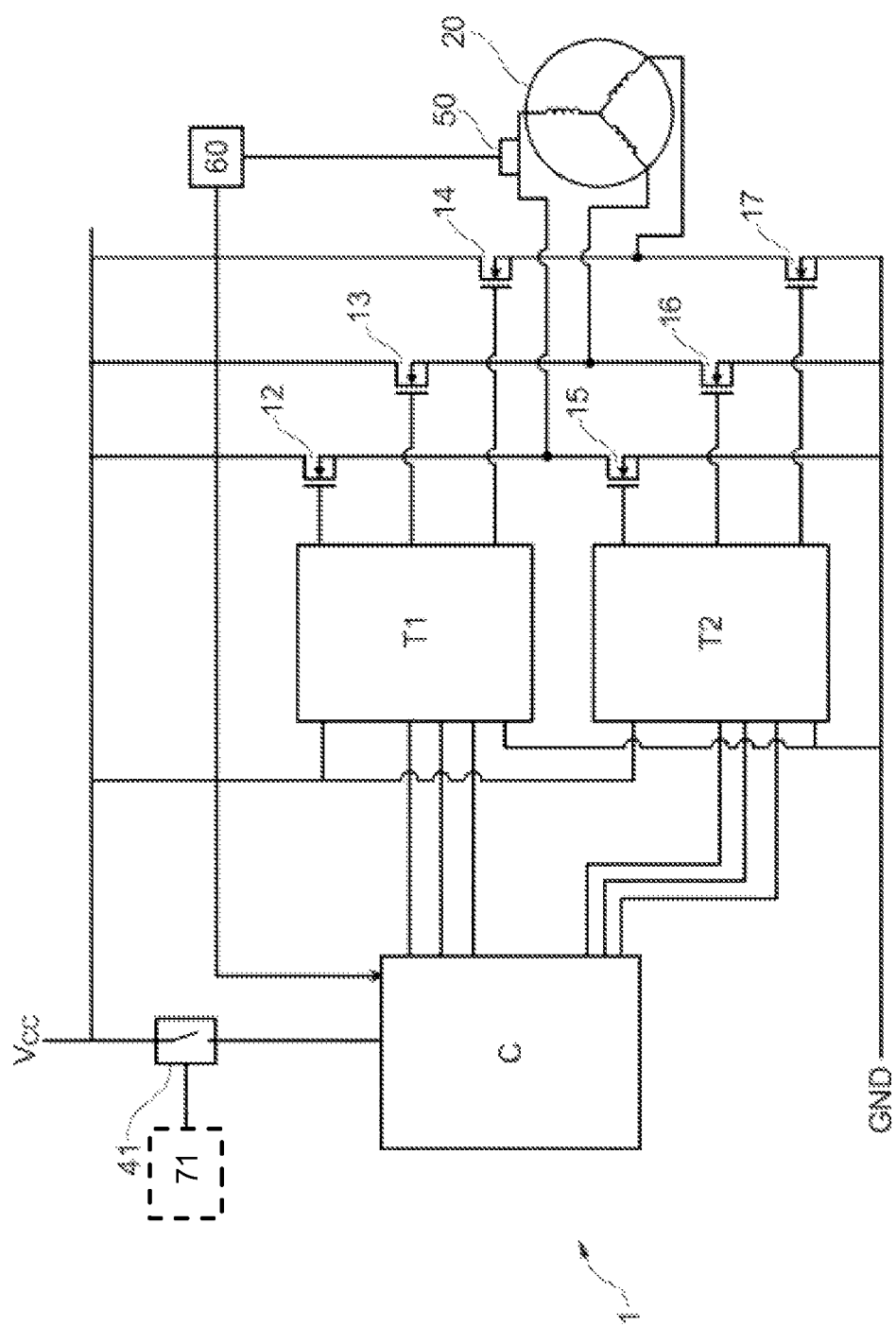

In the embodiment as shown in FIG. 2, a control mechanism 60 is provided. The control mechanism 60 introduces a predetermined delay between the shutdown command of the ON/OFF switch 41 and the shutdown of the Vcc voltage via a power contact to the controller 1. The control mechanism 60 can be configured with one or more energy storage components (e.g., capacitors) that are used to keep the power contact on for a predetermined time.

Alternatively, instead of or in addition to the control mechanism 60, the holding mechanism can also be implemented using software and executed via the controller 70. In particular, the controller 70 can be used to monitor the state of the switch 41. In this way, the controller 70 can monitor the trigger release and initiate braking even though the shutdown condition has already been activated.

Traditionally, electronic braking for BLOG motors has been implemented by turning on either the top or bottom MOSFETS in order to carry the braking current. In this approach, interruption has been achieved, for example, by continuously turning on all three low-side MOSFETs at once while keeping all three high-side MOSFETs off throughout the braking cycle, or vice versa.

According to the concept of the disclosure, an improved braking algorithm is provided where the braking current is divided between the high-side FETs 12, 13, 14 and the corresponding low-side FETs 15, 16, 17, via the driver components T1 and T2, in order to use all available MOSFETs for current reduction. In this embodiment, the high- and low-side MOSFETs 12, 13, 14, 15, 16, 17 turn ON and OFF alternately, sharing the current load needed for electronic braking. However, another algorithm for controlling the circuit breakers during braking is also conceivable.

Figure 3:
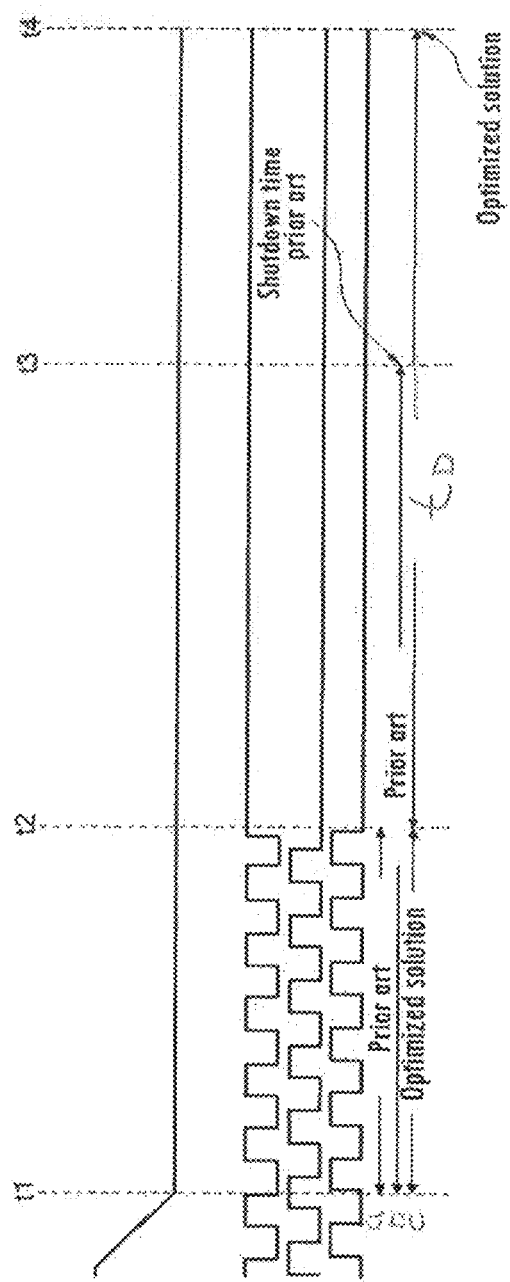
FIG. 3 Is a schematic view of a commutation profile at shutdown (once according to the prior art and once according to the present invention).

FIG. 3 shows a schematic profile at shutdown (once according to the prior art and once according to the present disclosure). In the upper curve (a) (prior art), braking takes place in the time period t1 to t2 (during the corresponding commutation phase). Curve (b) represents the shutdown period. The braking process thus starts at t1, while shutdown does not take place until time t3 is reached. Accordingly, the shutdown time begins at t1 and ends at t3.

In the solution according to the disclosure (curve c), these phases are consecutive. The braking process takes place in the time period t1 to t2 and then (as indicated by the arrows) the shutdown process follows, which ends at time t4. The device according to the disclosure is thus active for a longer period of time. This phase is also referred to as the "shutdown" phase.

The disclosure is not limited in its execution to the above mentioned preferred exemplary embodiments. Rather, a number of variants are conceivable that make use of the illustrated solution even in the form of fundamentally different embodiments.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A control unit for a motorized device comprising:

a brushless motor, a power supply, and an operating unit, that can be activated by a user;

the control unit is designed at least for controlling the commutation of the motor by a plurality of power switches connected to the power supply, and for initiating an electronic, non-mechanical, braking of the motor, when the control unit is deactivated, switched off, for a rotational speed-dependent duration $t_D$ after the detection of a specific motor condition or a defined point in time by a position sensor and is held until then in an active switched-on operating state and, dependent thereon, a controller is provided then to initiate, under automatic control, the shutdown of the device;

a memory is also provided were target values to, TARGET for the rotational speed-dependent period $t_D$ are stored for a large number of motor speeds over an entire motor speed range.

2. The control unit as set forth in claim 1, wherein the position sensor is a Hall sensor that transmits a signal to the control unit that is indicative of a motor condition.

3. The control unit as set forth in claim 1, wherein the control unit is configured in such a way that, after the time period $t_D$ has elapsed, the actual speed is detected and a check is performed as to whether the speed is greater than zero and the motor is still rotating and, in that case, the target value $t_{D,TARGET}$ stored in the memory for this speed is increased by a predetermined factor.

4. The control unit in claim 1, wherein the plurality of power switches have a plurality of high-side switches that are connected to a corresponding plurality of low-side switches, and the control unit is configured to switch the plurality of low-side switches and the plurality of high-side switches ON and OFF alternately in order to brake the motor.

5. The control unit in claim 1, wherein the operating unit has an ON/OFF switch that can be operated both manually and by the controller when a shutdown condition occurs.

6. The control unit as in claim 5, wherein the controller detects the then-current speed immediately when the ON/OFF switch is switched off and from this the delay in shutdown over the duration $t_D$ is controlled and the device is switched off only when the stoppage of the motor is detected after the period $t_D$ has elapsed.

7. The control unit as in claim 1, wherein a power contact is provided between the power supply and the control unit in order to ensure that current is made available to the control unit for the rotational speed-dependent duration $t_D$ when the ON/OFF switch has been switched off.

8. The control unit as in claim 1, further comprising an energy storage device, preferably a capacitor, where a specific amount of electrical energy is stored that is sufficient to provide the energy supply for a specific time period.

9. The control unit as set forth in claim 8, wherein the power supply of the controller is controlled after the ON/OFF switch is turned off by a predetermined discharge time by the stored energy in the capacitor, where a specific amount of electrical energy is stored that is sufficient to provide the energy supply for a specific time period.

10. A method for controlling a motor of a device with a control unit as set forth in in claim 1, with the following steps:
   a) initiating a shutdown command of the device;
   b) detecting the speed of the motor with speed detection at that point in time;
   c) identifying a holding period stored in a memory, namely a time span to stored for the determined speed;
   d) controlling a braking process of the motor during the time periods to by commutating the motor via a control unit;
   e) maintaining the active switched-on operating state for this time period to; and
   f) shutting the device down only after the motor has come to a stop.

11. The method as set forth in claim 10, wherein the speed is detected again before step f), and step f) takes place only when a specific speed is reached or the speed is zero and it is therefore certain that the motor has come to a stop, and otherwise steps b) to e) are repeated, successively, until the stoppage of the motor has been detected.

\* \* \* \* \*